(12) United States Patent
Mahr et al.

(10) Patent No.: US 6,438,094 B1
(45) Date of Patent: Aug. 20, 2002

(54) DEVICE FOR READING FROM OR WRITING TO RECORDING MEDIA IN DISC FORM EXHIBITING UNBALANCE

(75) Inventors: Peter Mahr, Weiler; Klaus Oldermann, Villingen-Schwenningen, both of (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/248,657

(22) Filed: Feb. 11, 1999

(30) Foreign Application Priority Data

Feb. 19, 1998 (DE) .......................................... 198 06 898

(51) Int. Cl.$^7$ .............................................. G11B 19/20
(52) U.S. Cl. ...................................... 369/253; 369/269
(58) Field of Search ................................ 369/269, 263, 369/266, 270, 53.3, 53.18, 253; 99/99.12, 98.08, 99.05

(56) References Cited

U.S. PATENT DOCUMENTS

| | | | | |
|---|---|---|---|---|
| 4,495,812 A | * | 1/1985 | Gorris | 73/468 |
| 5,005,748 A | | 4/1991 | Kim | 226/190 |
| 5,130,870 A | | 7/1992 | Jabbari | 360/99.08 |
| 5,140,575 A | * | 8/1992 | Fushiki | 369/44.33 |
| 5,581,521 A | * | 12/1996 | Nomura et al. | 369/32 |
| 5,583,845 A | | 12/1996 | Aki | 369/270 |
| 5,886,966 A | * | 3/1999 | Ota et al. | 369/54 |
| 5,930,220 A | * | 7/1999 | Shimano et al. | 360/110 |

FOREIGN PATENT DOCUMENTS

| | | |
|---|---|---|
| DE | 2506452 C2 | 9/1975 |
| DE | 939590 C2 | 5/1990 |
| EP | 227 158 A1 | 7/1987 |
| EP | 0829872 A2 | 3/1998 |
| EP | 0829872 A | 3/1998 |
| EP | 0836185 A2 | 4/1998 |
| EP | 0836185 A | 4/1998 ........... G11B/19/20 |
| JP | 4-241261 A | 8/1992 |
| JP | 7-170705 A | * 7/1995 |
| JP | 8-102024 A | * 4/1996 |
| JP | 10-3743 | * 1/1998 |
| JP | 11-39786 | * 2/1999 |
| WO | WO 9803974 A | 1/1998 ......... G11B/17/028 |

OTHER PUBLICATIONS

German Search Report.
German Search Report citing the above-cited references AA, AM, AN, AO, and citing references submitted in the IDS under 37 CFR 1.97 dated Jan. 11, 1999.
Patent Abstracts of Japan, vol. 098, No. 002, Jan. 30, 1998, & JP 09259517 A (Matsushita Electric Ind. Co. Ltd.) Oct. 3, 1997—abstract.
Patent Abstract of Japan, vol. 098, No. 005, Apr. 30, 1998 & JP 10003743 A (Hitachi Ltd.), Jan. 6, 1998—abstract.

(List continued on next page.)

*Primary Examiner*—Brian E. Miller
*Assistant Examiner*—Tianjie Chen
(74) *Attorney, Agent, or Firm*—Joseph S. Tripoli; Joseph J. Laks; Frederick A. Wein (57) ABSTRACT

The present invention relates to a device for reading from or writing to recording media in disc form which has an unbalance compensation means. The object of the invention is to propose a device of this type which has the smallest possible unbalance even when exchangeable recording media are used. This object is achieved according to the invention by virtue of the fact that the unbalance compensation means is a centrifugal force generation means which generates a centrifugal force which is variable during operation. According to another aspect of the present invention, provision is made for the unbalance compensation means to be a positioning means for positioning the recording medium. The field of application of the invention includes, inter alia, devices for reading from and/or writing to optical recording media such as CD, CD-ROM, DVD, DVD-ROM, DVD-RAM and the like.

6 Claims, 7 Drawing Sheets

OTHER PUBLICATIONS

Patent Abstracts of Japan, vol. 015, No. 266 (P–1223), Jul. 5, 1991, JP 03 086968 A (Fujitsu Ltd.), Apr. 11, 1991—abstract.

Patent Abstracts of Japan, vol. 014, No. 540 (M–1053). Nov. 29, 1990, & JP 02 229940 A (Copal Electron Co. Ltd.), Sep. 12, 1990—abstract.

Patent Abstracts of Japan, vol. 014, No. 376 (P–1092), Aug. 14, 1990, & JP 02 139758A (Cannon Inc.), May 29, 1990—abstract.

Patent Abstracts of Japan, vol. 098, No. 014, Dec. 31, 1998, & JP 10 247359A (Hitachi Ltd.), Sep. 14, 1998.

European Search Report listing the above–cited references: AM, AN, AO, AR, AS, AT, AU, AV, and AW.

* cited by examiner

DEVICE FOR READING FROM OR WRITING TO RECORDING MEDIA IN DISC FORM EXHIBITING UNBALANCE

FIELD OF THE INVENTION

The present invention relates to a device for reading from and/or writing to recording media in disc form which has an unbalance compensation means.

BACKGROUND OF THE INVENTION

A device of this type is disclosed in WO 84/01863. This device has a brushless DC motor as drive motor which causes the recording medium in disc form to effect a rotary movement. The recording medium is secured to the drive motor by means of a securing means, in this case the motor hub. In order to obtain a rotary movement of the recording medium which is as free as possible from unbalance, the DC motor, as the unbalance compensation means, is designed in such a way that milling has to be effected only once at one location in order to obtain unbalance compensation. The device is constructed in such a way that no unbalance can arise in the course of assembly, repair or the like.

The known device may be regarded as having the disadvantage that freedom from unbalance exists only when the recording medium in disc form also has no unbalance at all. Although this can be ensured in the case of hard disc devices, this is not so in the case of devices having exchangeable recording media.

SUMMARY OF THE INVENTION

The object of the invention is to propose a device of the abovementioned type which has the smallest possible unbalance even when exchangeable recording media are used.

This object is achieved by means of the measures specified in the independent claims.

The invention provides for the unbalance compensation means to be a centrifugal force generation means which generates a centrifugal force which is variable during operation. The advantage of such a dynamic unbalance compensation means consists in the fact that tolerances of the recording medium, tolerances in the securing thereof and also tolerances of the drive motor are permitted to be relatively high without the unbalance caused thereby having a disruptive influence on the operation of the device, since this unbalance is compensated for by the dynamic unbalance compensation means and is adapted to possibly changing conditions even during operation. Recording media afflicted by unbalance, such as so-called shape CDs, for example, which under certain circumstances do not have uniform mass distribution, can be played back without difficulty in a device according to the invention.

Another aspect of the present invention provides for the unbalance compensation means to be a positioning means for positioning the recording medium. This has the advantage that the unbalance is compensated for directly at its source. That proportion of the unbalance which is caused by the recording medium or the positioning thereof in the device and, by its nature, cannot be compensated for during the production or service of the device is thus compensated for. The positioning means serves to position the recording medium in such a way that the centre of mass of the said recording medium is oriented such that it is centred with respect to the axis of the drive motor or the axis of rotation of the recording medium.

According to the invention, the positioning means has spring elements and damper elements, which are arranged such that they are distributed uniformly over the circumference of the unbalance compensation means. This has the advantage that automatic centring of the recording medium relative to its axis of rotation is enabled as a result of this. Spring and damper forces cancel one another out by virtue of the uniformly distributed arrangement, and forces occurring in the event of an unbalance act on the spring and damper elements in such a way that the centre of mass of the recording medium is displaced towards the axis of rotation. This is carried out at a relatively low speed of rotation which is matched to the spring and damper forces or properties. The self-centred position of the recording medium is subsequently fixed and maintained.

According to the invention, the centrifugal force generation means has a mass element, which can be moved during operation. This has the advantage that the centrifugal force can be altered in a simple manner by alteration of the position of the mass element. In this case, the mass element is advantageously arranged on a rotating part and in a manner such that it can move with respect to this part, with the result that a displacement of the mass element is accompanied by an alteration of the unbalance. The invention provides for the use of one or more mass elements of this type. A single mass element is advantageously designed such that it can be displaced both radially and in the angular direction with respect to the rotation of the rotating part. The use of two mass elements has the advantage that they need be arranged such that they can be displaced in each case only in one dimension, that is to say radially or in the angular direction, in order to be able to compensate for the unbalance. The use of a larger number of mass elements, for example three, four or more, leads to more uniform mass distribution also in the direction of the axis of rotation. The higher symmetry that is obtained for these and even higher numbers such as, for example, six, eight, etc., contributes to reducing the wear and to simplifying production of the device.

The invention provides for two mass elements to be arranged such that they can move about the axis of rotation of the recording medium. This has the advantage that a change in the angular position of the mass elements is easily possible by virtue of the arrangement allowing movement about the axis of rotation. Since two mass elements are involved, the radial component of the mass distribution can also be set in a simple manner by a symmetrical change in the angular position of these mass elements. The mass elements advantageously have essentially the shape of a segment of a circle or segment of an annulus, in particular the shape of a semicircle or of half an annulus. If there are more than two mass elements, provision is made for correspondingly smaller segments of a circle which together produce a full circular disc, the consequence of this being the most uniform mass distribution possible. The movable securing of the mass elements should be designed to be as compact as possible in order to disrupt the mass distribution as little as possible. Segments of an annulus have the advantage that a greater mass accumulation is present radially on the outside, which, given an identical additional mass, enables greater effectiveness than in the case of radially uniform mass distribution. The axis of rotation is generally identical to that of the drive motor. The mass elements are advantageously arranged in proximity to the recording medium in order to compensate for the unbalance as close as possible to its source, and consequently to minimize mechanical stresses on the spindle and the bearings thereof, and also to prevent the propagation of vibration on device or drive motor to the greatest possible extent.

A further refinement of the invention provides for a plurality of small mass elements to be used which can be placed along a circumference or a radius of the centrifugal force generation means. This has the advantage that a larger number of mass elements can easily be metered and a high outlay in terms of mechanical holding is unnecessary, as a result of which the centrifugal force generation means can be designed in a space-saving manner. The mass elements can advantageously be placed on a circumference which, in the radial direction, is relatively far removed from the centre, since, at that location, their influence is relatively large even when the total mass is relatively small. In this case, the mass elements are advantageously held by the centripetal force, which is not present without rotation of the recording medium, in which case, however, unbalance compensation is not necessary either.

Instead of a circumference or a radius of the centrifugal force generation means, it is likewise possible to use the circumference or the radius generally of a rotating part, without leaving the scope of the present invention. The mass elements are advantageously designed as fine- or coarse-grained powder arranged, for example, in a closed container, in order to avoid any loss, in air, a specific other gas, at excess pressure or negative pressure, in a liquid or the like. The individual particles are advantageously of essentially spherical design so that they can be packed as densely as possible. It is advantageous, however, for them to have a flattened or rough surface in order to increase the reciprocal friction and, consequently, to hold a position which, once assumed, is classified as optimal.

The invention furthermore provides an adhesion element or a holding element to be arranged on the circumference and/or on the radius of the centrifugal force generation means. This has the advantage that, in addition to the centripetal force, a holding force or adhesion force is exerted on the mass elements, as a result of which the latter are held in their set position even with a reduced rotational speed. This solution is advantageous particularly when the rotary movement of the recording medium is stopped without the latter being removed from the device. In the event of subsequent, renewed operation, the unbalance compensation is then still preserved and it is possible to go over to interference-free playback operation more rapidly. The adhesion element is, for example, an adhering surface coating, for example an adhesive layer, a layer of electrostatic charge, a magnetized layer in the event of using magnetizable particles as mass elements, or another suitable adhesion element. The holding element is designed for example as a rough surface, as a surface like a bed of nails, or as a differently configured surface, in which the mass elements are fixedly suspended or are caught. Cavities with openings arranged in the direction of rotation are advantageously provided as the holding elements. This has the advantage that the mass elements are received and held therein. In order to neutralize the mass distribution that has been set, acceleration in the opposite direction is provided for example, as a result of which the mass elements are removed from the cavities.

According to the invention, the unbalance compensation means has a control means, which essentially follows the rotary movement of the unbalance compensation means. This has the advantage that the unbalance compensation means and the control means concomitantly rotating with the latter are at rest relative to one another, thereby making it unnecessary to transmit for example control information, energy, force or mutual influencing from stationary to rotating parts or elements. The mechanical and electrical outlay are thus reduced, as, too, is the power loss.

According to the invention, the control means is a lever element. This has the advantage that the control means is of mechanical design, does not require the supply of electrical energy and is simple to realize. Preferably, a plurality of lever elements, in particular ones of identical design, are used, one or else a plurality of lever elements being provided for each mass element.

According to the invention, the lever element has a point of action on a rotating part, a further point of action on a stationary part and also a point of action on a mass element. This has the advantage that point of action and lever element are arranged and designed in such a way that relative displacements, caused by the unbalance, of the points of action on the stationary part and on the rotating part initiate leverage which effects a displacement of the mass element in the opposite displacement direction to that caused by the unbalance.

Another aspect of the invention provides for the unbalance compensation means to have a control means which is arranged such that it is essentially stationary with respect to the device. This has the advantage that a control means arranged fixed with respect to the housing reduces the number of parts arranged such that they rotate and, consequently, the space requirement thereof. A control means arranged fixed with respect to the housing has the advantage, moreover, that supply lines e.g. for the purpose of control, power supply, etc., from the housing are possible without difficulty on account of the arrangement fixed with respect to the housing. Furthermore access to an actuating means which is arranged fixed with respect to the housing is possible without difficulty.

According to the invention, the stationary control means is a braking means, which influences the angular position and/or the radial position of the mass element. This has the advantage that the control is effected by a stationary braking means, and information and energy transmission can be realized in a simple manner. The braking means is advantageously an electromagnetic coil which moves a brake lever into one or two braking positions in which the mass element is braked. For example, the angular position of second mass elements is influenced, thereby enabling good unbalance compensation by means of a small number of components.

According to the invention, the braking means influences a positioning gear mechanism with rotating elements which is part of the unbalance compensation means. This has the advantage that the elements of the positioning gear mechanism are braked by the braking means and a gearing movement is thereby initiated. In this case, with a suitable design of the positioning gear mechanism, a single mass element is positioned in the radial direction and in the direction of rotation.

The invention furthermore provides for the braking means to be part of an engagement means for the recording medium in disc form. This has the advantage that a component which is present in any case is used for the purpose of unbalance compensation in a phase in which it is inactive in any case. The part of the engagement means is advantageously a lever by which another element, the so-called puck, is moved towards the recording medium or away from the latter. In this case, the unbalance compensation means is advantageously integrated in the engagement means. This has the advantage that the unbalance compensation means engages from the other side of the recording medium compared with the drive motor, and this means that on the drive motor side, it is not necessary to make any modifications to a device whose construction may have already been completed, and, nevertheless, the unbalance compensation means can be integrated since structural space for arranging the unbalance compensation means is more likely to be available on the side remote from the motor.

According to the invention, the control means has a long-range-force-generating element. This has the advantage that direct mechanical contact between control means and mass element or other rotating parts of the unbalance compensation means is unnecessary, thereby obtaining a reduction in friction losses. The long-range force that is provided is, for example, a magnetic force, generated by an electromagnetic, for example, an electrostatic force or another force transmitted without direct contact. According to the invention, the mass element is a magnetizable mass element and the long-range-force-generating element is a magnet. This has the advantage that magnetizable mass elements, for example iron particles, are inexpensive materials which are simple to manipulate. Magnets, in particular electromagnets, are likewise inexpensive to produce and, as mass-produced articles, have well-known properties. The magnetizable mass elements are positionally displaced by means of the magnet; for example, when iron particles are used, they are attracted by means of the electromagnet, gathered and, with the drive motor rotating, released at an angular position which has been determined as suitable. They are then pressed by the centrifugal force against an outer wall to which, for their part, they pass on the centrifugal force. The magnetizable mass element that is provided may be either an individual mass element or a small number of individual mass elements, or else a large number of mass elements, for example pulverulent mass elements. A magnetic fluid can likewise advantageously be used in this case.

The electromagnet is advantageously arranged in such a way that the force acts essentially in the radial direction, which enables a flat design of the centrifugal force generation means. A compact design in the radial direction is obtained when the electromagnet is arranged above or below the plane of the centrifugal force generation means, that is to say when the force acts essentially in the axial direction. A single electromagnet serves to release mass elements if appropriate in a metered manner or at various locations. Two electromagnets are provided in order to release mass elements at different locations so that optimum mass compensation, for example in accordance with two emplaceable mass elements, is consequently obtained. The arrangement of three or more magnets which are advantageously of smaller design and are arranged with higher symmetry also lies within the scope of the invention.

According to the invention, the unbalance compensation means is an additional force generation means, which is advantageously a long-range force generation means. This has the advantage of a lower mechanical outlay and, consequently, a reduced susceptibility to interference, since a movable mass element is not necessary and the centrifugal force is generated in a different way.

According to the invention, the long-range force generation means is a magnetic field generation means. This has the advantage that a magnetic force is relatively simple to generate, and that it has no, or only slight, interfering influences on other parts of the device. It is advantageous for a plurality of electromagnets to be arranged in a stationary manner, the said electromagnets exerting a force of attraction on a magnetizable, rotating element. In this case, at least three electromagnets, but advantageously a larger number thereof, are arranged such that they are distributed uniformly over the circumference. They are driven in such a way that a circulating magnetic field is produced which circulates at the rotation frequency of the rotating element and, consequently, exerts a force having a constant direction with respect to this rotating element. The field is generated in such a way that this force has a magnitude and direction suitable for compensating for the unbalance. Another advantageous refinement consists in equipping the rotating element with one or more electromagnets and arranging permanent magnets on the circumference in a stationary manner, all of which permanent magnets have their north poles directed radially inwards, for example. This has the advantage that the rotation frequency of the magnetic field generated always correctly corresponds to that of the recording medium and, consequently, specific regulation is not necessary for this. The electromagnets are advantageously supplied with energy inductively.

According to the invention, the magnetic field generation means is integrated in the drive motor. This has the advantage that no additional structural space is necessary for the magnetic field generation means in the device, and that this function is in any case obtained in the drive motor designed as an electric motor. Given an electronically commutated motor, a centrifugal force control signal is accordingly superposed on the normal signal of the solenoids, with the result that the circulating force which compensates for the unbalance is additionally superposed on the circulating travelling field. Instead of the magnetic field generation means, it likewise lies within the scope of the invention to integrate a general long-range force generation means in the drive motor.

The invention provides for a sensor and an evaluation means to be present in the device. This has the advantage that the requisite centrifugal force is optimally determined and set in terms of magnitude and direction. A slow run-up to the optimum value or rapid overshooting beyond this optimum value need not be feared, therefore. Consequently, the optimum operating state is reached rapidly and reliably. The evaluation means evaluates the sensor signal and determines the tractive force suitable for unbalance compensation.

According to the invention, the sensor is a vibration sensor. This has the advantage that the undesirable property caused by the unbalance is measured directly. In this way, the unbalance is compensated such that minimum vibration is achieved. This applies, when a vibration sensor is used, even when other influences are superposed on the unbalance and, therefore, optimum unbalance compensation possibly does not correspond to optimum vibration damping.

According to the invention, the unbalance compensation means has a sensor element, an evaluation means and a centrifugal force generation means and/or a positioning means, which are all arranged on a rotating part of the device. This has the advantage that the unbalance compensation means is arranged in a particularly space-saving manner, since an information flow between a rotating part and a non-rotating part is not necessary.

The said elements are advantageously designed as micromechanical and microelectronic elements, so-called mechatronic elements. Accordingly, sensor element, evaluation means, centrifugal force generation means and/or positioning means are all arranged on a single mechatronic support element. The sensor is advantageously designed as a rotation sensor. The positioning means and/or the centrifugal force generation means are/is designed for example as micropump and microvalves interacting therewith, which displaces hydraulic mass elements and/or positions the recording medium. Since, in some instances, only relatively small masses are required for the compensation, micromechanical elements can be used practically in this case. Energy is advantageously supplied by way of the electrodynamic effect or coupling-in of radiation.

An inventive method for setting a variable centrifugal force of a centrifugal force generation means has the steps specified in the independent method claim.

These steps have the advantage that a simple yet reliable method is realized in this way for the purpose of setting a centrifugal force and hence compensating for the unbalance which is caused in a device for reading from and/or writing to recording media in disc form as a result of non-uniform mass distribution of the recording medium or inaccurate positioning thereof in the device. In this case, the comparison of the difference between present value and stored value is preferably effected in terms of magnitude or by way of defined upper and lower threshold values. In general, the change in the moment of inertia is preferably effected by changing the radius, but may likewise advantageously be obtained by changing the mass of the mass element. A step d), addition of a mass element, is advantageously carried out between steps c) and e) of he method. The addition may consist in the actual insertion of a mass element from the outside into the centrifugal force generation means; however, addition may likewise be understood to mean that a mass element is moved from a starting position to a different suitable position.

Further advantages and refinements of the invention may be gathered from the following description of advantageous exemplary embodiments.

BRIEF DESCRIPTION OF THE DRAWINGS

FIG. 4b shows a device according to the invention with unbalance compensation means in accordance with FIG. 4a;

DETAILED DESCRIPTION OF PREFERRED EMBODIMENTS

Figure 1:
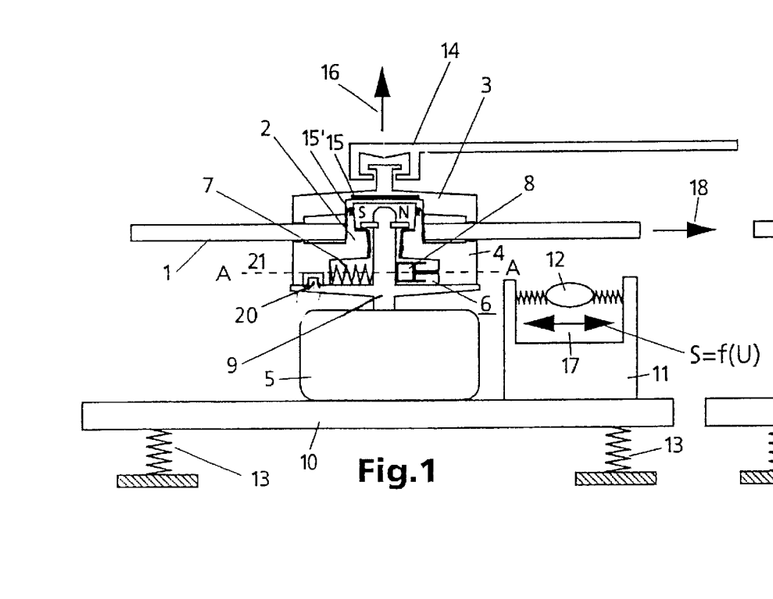
FIG. 1 shows a device according to the invention with unbalance compensation means designed as positioning means in a first operating position.

FIG. 1 shows a basic illustration of a device according to the invention. A recording medium 1 in disc form is secured on a disc turntable 4 by means of a securing means formed from a centring pin 2 and a holding element 3. The holding element 3 is often referred to as a puck as well. The disc turntable 4 is made to effect rotary movement by a drive motor 5. The unbalance compensation means, which is a positioning means 6 in this exemplary embodiment, is integrated in the disc turntable 4. A spring element 7 and a damper element 8 of the positioning means 6 are evident, which engage on the drive shaft 9 of the drive motor 5, on the one hand, and on the disc turntable 4, on the other hand.

The drive motor 5 is arranged on a support element 10, on which a scanner 11 is likewise situated. Like all the other elements of FIG. 1, the scanner 11 is illustrated only diagrammatically. All that is illustrated diagrammatically of the components of the scanner 11 which are known to a person skilled in the art is a lens 12 which is movable radially and vertically with respect to the plane of the recording medium 1. The support element 10 is connected to the housing (not illustrated) of the device via damper elements 13 in a manner essentially decoupled from vibration.

A lever 14 serves to lift off the holding element 3 and thus release the recording medium 1 for removal from the device. In its position illustrated in FIG. 1, in which it is in contact with the recording medium 1, the holding element 3 is pressed by magnetic forces onto the recording medium 1. For this purpose, a magnet 15 is arranged on the holding element 3 and a magnet 15' is arranged on the centring pin 2. The lever 14 is moved in the direction of the arrow 16.

It may be assumed in the exemplary embodiment that the recording medium 1 in disc form is an optical recording medium, for example a CD or a DVD, which has circularly or spirally arranged data tracks which are scanned by means of a light beam focused by the scanner 11 and the lens 12. In this case, the rotary movement of the recording medium 1 and the mobility of the lens 12 and of the scanner 11 in the radial direction make it possible for the light beam to follow the data track. The mobility in the radial direction is indicated by the arrow 17.

If the recording medium 1 has an unbalance, or if it is arranged such that it is not exactly centred in the device, then an unbalance U occurs, for example in the direction of the arrow 18. The consequence of the unbalance U is that vibrations are transmitted to the scanner 11 via the disc turntable 4, the drive motor 5 and the support element 10. The larger these vibrations are, the greater the radial movement of the lens 12 is influenced. The vibration S is a function of the unbalance U; the following holds true: S=f(U).

In order to compensate for an unbalance U caused by the recording medium 1 or its securing, the lever 14 is first of all held in the position illustrated in FIG. 1, in which it is not yet completely lowered, and the drive motor 5 is caused to rotate. In this case, the force engendered by the unbalance U acts on the disc turntable 4, which transmits this force to the drive shaft 9 via spring element 7 and damper element 8. Since the disc turntable 4 and the drive shaft 9 are provided with play relative to one another, the disc turntable 4 is in this case displaced relative to the drive shaft 9.

Figure 2:
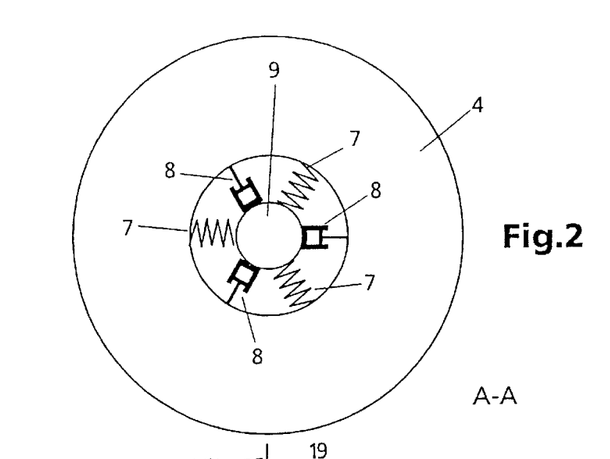
FIG. 2 shows a sectional illustration of the device according to the invention from FIG. 1 along the line AA.

FIG. 2 shows a section through FIG. 1 along the line AA. It is evident that a plurality of spring elements 7 are arranged such that they are distributed uniformly over the circumference, each spring element 7 being assigned a damper element 8 situated opposite on the other side of the drive shaft 9. The spring constants of the spring elements 7 and the damping constants of the damper elements 8 are coordinated with one another in such a way that they enable automatic displacement of the disc turntable 4 relative to the drive shaft 9 at least at a specific rotation frequency which is set for the purpose of unbalance compensation. As soon as the disc turntable 4 is in a centred position with respect to the drive shaft 9, which is determined by means of a sensor, for example, but may also be assumed to be reached after a predetermined period of time has elapsed, the lever 14 is lowered in accordance with arrow 16'. It then assumes its lowered position illustrated in FIG. 3. In doing so, a tip 19 of the lever 14 comes into contact with the holding element 3 and, consequently, fixes the radial position of the holding element 3 and of the disc turntable 4 connected thereto via the centring pin 2 in the centred position, that is to say the position in which the unbalance has been compensated. The rotational speed of the drive motor 5 can now be raised to the speeds which are suitable for reading from or writing to the recording medium 1, without any fear that the disc turntable 4 will be displaced and, consequently, that there will be a renewed unbalance U≠0.

Figure 3:
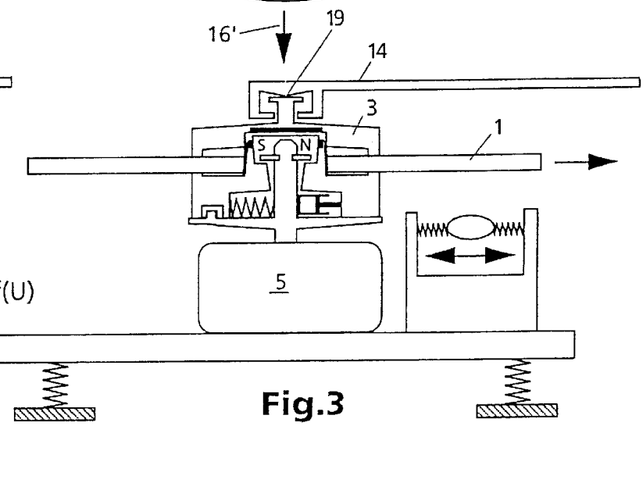
FIG. 3 shows the device according to the invention from FIG. 1 in a second operating position.

The remaining parts of FIG. 3, which are not specifically described, correspond to those described with regard to FIG. 1. The rotation of the drive shaft 9 is transmitted via a drive pin 20, which engages in a recess 21 in the disc turntable 4, to the latter and hence to the recording medium 1.

Figure 4A:
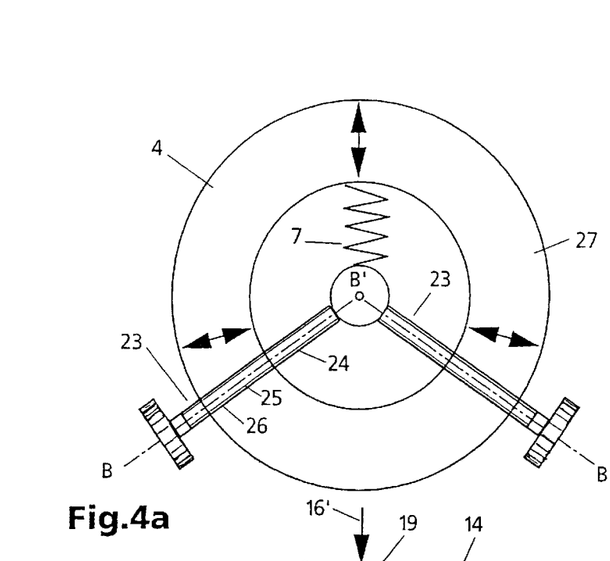
FIG. 4a shows a basic illustration of an unbalance compensation means of a device according to the invention, in plan view.

FIG. 4a shows a basic illustration of part of an unbalance compensation means which can be arranged either in an unbalance compensation means designed as positioning means or in an unbalance compensation means designed as centrifugal force generation means. In this case, a section in accordance with, for example, FIG. 2 is once again illustrated diagrammatically, the disc turntable 4 being supported, on the one hand, on the drive shaft 9 by means of a spring element 7 and, on the other hand, by means of two adjustable positioning pins 23. The positioning pins 23 engage in holes 26 in the disc turntable 4 and are provided with an external thread 24, which interacts with an internal thread 25 in the holes 26. In this way, by rotation of the positioning pins 23, it is possible to alter the distance between the disc turntable 4 and the drive shaft 9, with lengthening of the respective hole. Consequently, suitable adjustment of the two positioning pins 23 enables the disc turntable 4 to be centred with respect to the drive shaft 9 in the sense of unbalance compensation.

Instead of the disc turntable 4, however, it is also possible, in accordance with a further aspect of the invention, to arrange a mass element 27 such that it can be displaced with respect to the drive shaft 9 by means of spring element 7 and positioning pins 23. In this case, the unbalance compensation means is not designed as positioning means but rather as centrifugal force generation means. In this case, namely, the positioning of the mass element 27 means that the position of the recording medium 1 is left unchanged, while the unbalance U caused by the said recording medium is opposed by an opposite centrifugal force or unbalance U' caused by corresponding displacement of the mass element 27.

Figure 4B:
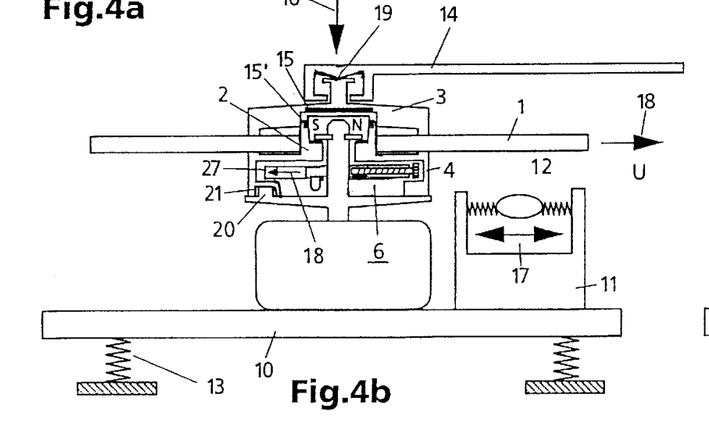

FIG. 4b illustrates this diagrammatically in a device according to the invention, in a sectional illustration. The unbalance U, indicated by the arrow 18, of the recording medium 1 is opposed by the unbalance U' or centrifugal force caused by the mass element 27 and indicated by the arrow 18'. The remaining elements contained in FIG. 4b correspond to those described with reference to FIG. 1 and FIG. 3 and, therefore, are not specifically explained here.

Figure 5:
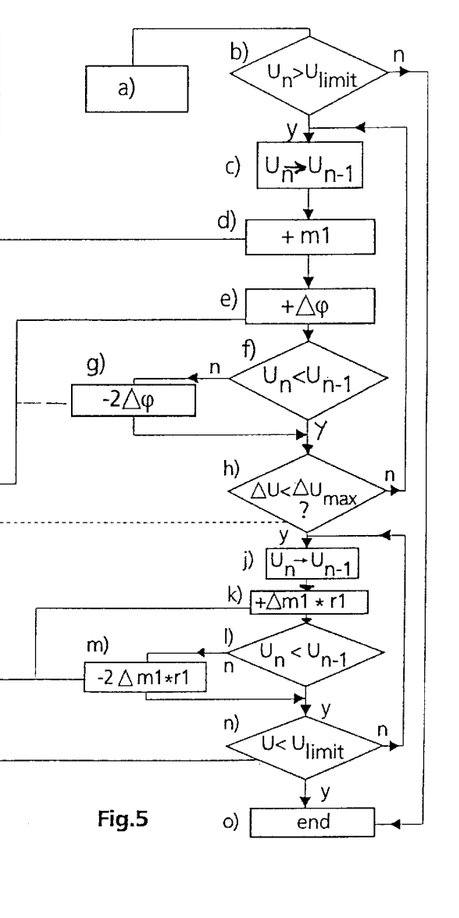
FIG. 5 shows a flow diagram of a method according to the invention.

FIG. 5 illustrates a flow diagram of a method according to the invention. With regard to individual steps of the method illustrated in FIG. 5, diagrams are represented in FIGS. 5a to 5f for the purpose of clarification.

The method, illustrated in FIG. 5, for setting a variable centrifugal force of a centrifugal force generation means begins in step a) with the start of the setting procedure. In step b) a measured value $U_n$, which corresponds to an unbalance, is compared with a predetermined lower limit value $U_{limit}$. If the measured value $U_n$ is below the limit value $U_{limit}$, the method branches to step o), the end of the setting procedure. Otherwise, in step c), the present value $U_n$ of the unbalance is stored as stored value $U_{n-1}$.

Figure 5A:
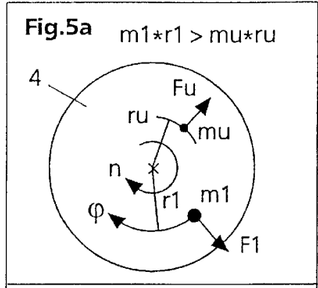
FIGS. 5a–f show unbalance-angle diagrams for elucidating the method represented in FIG. 5.

FIG. 5a diagrammatically shows the disc turntable 4 which has an unbalance. The said unbalance is indicated in an exaggerated manner by the mass point $m_u$, which is situated at a distance $r_u$ from the centre of the disc turntable 4, axis of rotation. A force $F_u$ is engendered by this unbalance. A mass element $m_1$ is situated at a distance $r_1$ from the axis of rotation. Its position is variable in the direction of rotation, this being indicated by the arrow designated by $\phi$. The arrow designated by n specifies the direction of rotation of the disc turntable 4. In FIG. 5a, the moment of inertia $m_1 r_1$ corresponding to the mass element $m_1$ is greater than the moment of inertia $m_u r_u$ corresponding to the eccentric centre of mass $m_u$, this being indicated by the size of the points designated by $m_1$ and $m_u$.

Figure 5B:
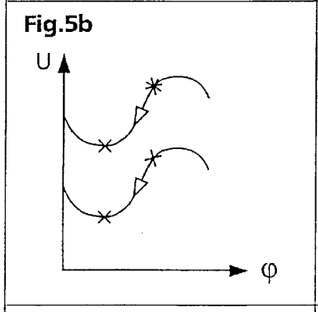
Figure 5C:
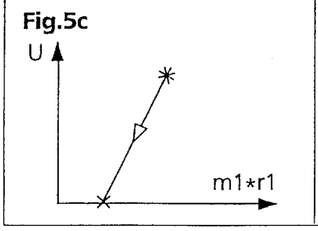
Figure 5D:
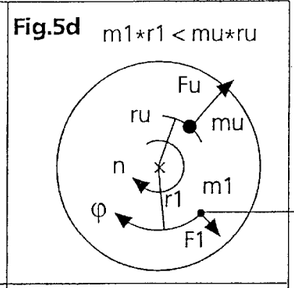

FIG. 5d corresponds to the illustration of FIG. 5a with the difference that the relative sizes of $m_1 r_1$ and $m_u r_u$ are reversed in this case. The procedure for ascertaining a value corresponding to the unbalance $U_n$ corresponds to the method as far as step c).

In step e) the angular position of the mass element $m_1$ is changed by a first value. This is a predetermined positive value $+\Delta\phi$ in the exemplary embodiment. In step f) a present measured value $U_n$ of the unbalance is compared with the stored value $U_{n-1}$, and, if the present value $U_n$ is less than the stored value $U_{n-1}$, the method branches to step h). Otherwise, in step g), the angular position of the mass element $m_1$ is changed by a second value (which is negative in the exemplary embodiment) $-2\Delta\phi$. In the exemplary embodiment, the magnitude of this value is twice as large as that of the first, positive value. In general, however, it suffices if sign and magnitude do not correspond to those of the first value $+\Delta\phi$ from step e).

In the subsequent step h), the difference ΔU between present value $U_n$ and stored value $U_{n-1}$ is compared with a threshold value $ΔU_{max}$. If the difference ΔU is greater than the threshold value $ΔU_{max}$, the method branches to step c). Otherwise, in step j), the present value $U_n$ is stored as stored value $U_{n-1}$.

Figure 5E:
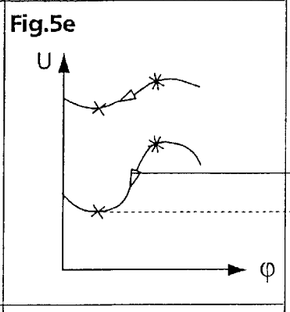

The angular position changes in accordance with the arrow designated by ϕ in FIG. 5a and FIG. 5d. FIGS. 5b and 5e show a diagram in which unbalance is plotted against angular position. In this case, the two curves each correspond to a mass $m_1$ which is large and small, respectively, with regard to $m_u$. Each curve has a minimum, that is to say an angular position at which the resultant unbalance is the least. This point is indicated in each case by an x, while the starting point, which, in general, does not coincide with the minimum of the curve, is marked by an *.

By optionally multiple iteration of steps c) to h), the angular position of the mass point $m_1$ is changed in such a way that the minimum or a point near the minimum is reached. It has turned out to be particularly advantageous to branch to step j) if the difference ΔU is below 5%.

In step k) the moment of inertia of the mass element $m_1$ is changed by a first value $+Δm_1 r_1$, which is chosen to be a positive value in the exemplary embodiment. A comparison between the present measured value $U_n$ and the stored value $U_{n-1}$ is then carried out in step l). If the present value $U_n$ is less than the stored value $U_{n-1}$, the method branches to step n). Otherwise, in step m), the moment of inertia of the mass element $m_1$ is changed by a second value $-2Δm_1 r_1$, whose sign and magnitude do not correspond to those of the first value $+Δm_1 r_1$ from step k). In step n) the difference ΔU between present value $U_n$ and stored value $U_{n-1}$ is compared with a lower limit value $U_{limit}$. If the limit value $U_{limit}$ is exceeded, the method branches to step j), otherwise the end of the setting procedure is reached with step o).

Figure 5F:
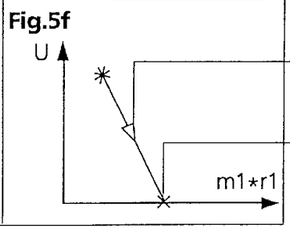

These steps are illustrated in FIGS. 5c and 5f by diagrams in which unbalance is plotted against moment of inertia. By changing the moment of inertia $m_1 r_1$ from the starting point indicated by * to the end point indicated by x, complete or virtually complete compensation of the unbalance caused by the eccentrically arranged centre of mass $m_u$ is obtained. In the simplest case, the distance between $m_1$ and the axis of rotation is, for this purpose, reduced in accordance with FIG. 5c or increased in accordance with FIG. 5f. However, a corresponding effect can also be achieved by changing the mass $m_1$, for example by removing or adding mass elements. In general, any measure which correspondingly changes $m_1 r_1$ can expediently be used in this case.

It is advantageous to add a mass element $m_1$ in a step d) between steps c) and e), which mass element is then displaced, in the following steps, in the angular direction and radially in order to obtain the change in the angular position and in the moment of inertia. This corresponds to the introduction of the mass point $m_1$ at its starting position in FIGS. 5a and 5d.

Figure 6:
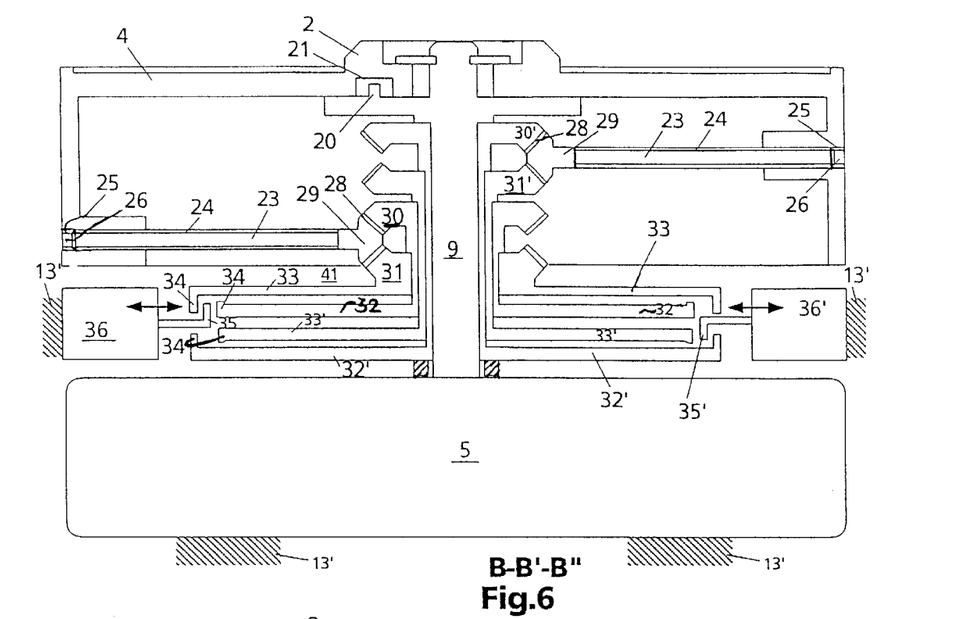
FIG. 6 shows a device according to the invention with positioning means.

FIG. 6 shows part of a device according to the invention with positioning means for the recording medium 1. The drive motor 5 is illustrated, as is its drive shaft 9, which drives the disc turntable 4 via a drive pin 20, which extends into a recess 21. In this case, the region illustrated above the drive motor 5 is illustrated essentially as a section corresponding to the lines BB'B" from FIG. 4a. The upper part of the drive shaft 9 has a radial distance from the disc turntable 4, and also from the drive pin 20 in the recess 21. This enables the disc turntable 4 to be displaced radially with respect to the drive shaft 9.

The holes 26 with an internal thread 25 which are arranged in the disc turntable 4 are evident. The external thread 24 of the positioning pins 23 engages in the internal thread 25. At their radially inner end, the positioning pins 23 have a head 29 provided with a toothed rim 28. The respective upper region of the head 29 in the figure engages in a helical gearwheel 30, 30', and the respective lower part engages in a helical gearwheel 31, 31'. The helical gearwheels 30, 30', 31, 31' each have a toothed rim inclined downwards and upwards, respectively. They are connected to nested cylindrical elements whose respective other ends have radially outwardly protruding braking elements 32, 32', 33, 33'. At their radially outer end, the braking elements 32, 32', 33, 33' each have an annular rim 34, which can be brought into contact with a brake lever 35, 35' in order to brake the respective braking element 32, 32', 33, 33' and hence the associated helical gearwheel. For this purpose, the brake lever 35, 35' is actuated radially inwardly or radially outwardly by a control element 36, 36', for example an electromagnetic actuator. The braking of the rotary movement of one of the braking elements 32, 32', 33, 33' results in the braking of the respectively associated helical gearwheel 30, 30', 31, 31', whereby the corresponding positioning pin 23 is made to rotate and, consequently, shortens or increases the distance between the disc turntable 4 and the drive shaft 9.

By a suitable combination of the settings of the two positioning pins 23, it is thus possible, as described with regard to FIG. 4, to set any suitable position of the disc turntable 4. The recording medium 1, which is not illustrated in this case, is consequently displaced correspondingly via the centring pin 2.

In order to obtain enhanced vibration decoupling, both the control elements 36, 36' and the drive motor 5 are secured by damper elements 13' to their respective holding elements, which are not illustrated here.

Figure 7:
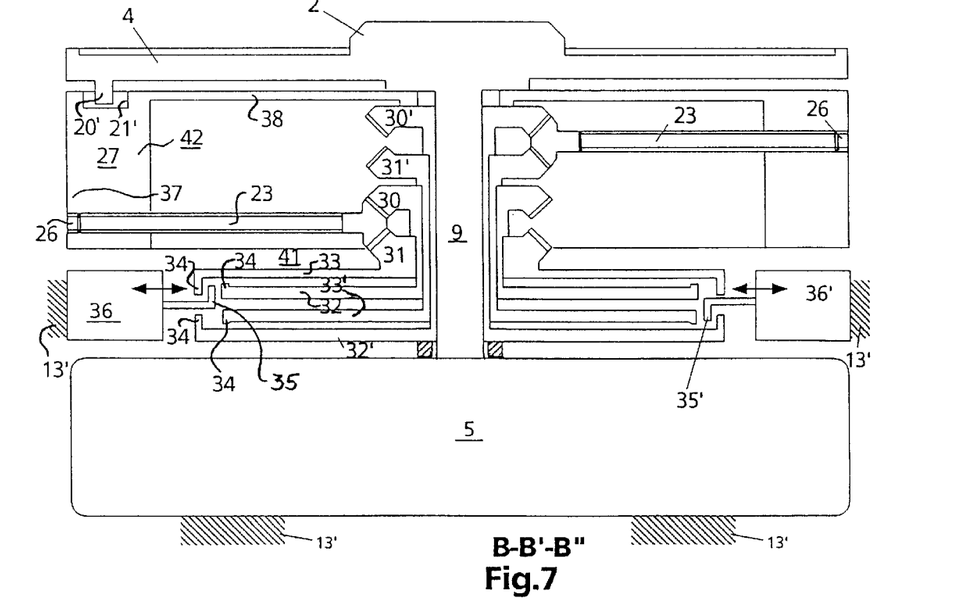
FIG. 7 shows a device according to the invention with centrifugal force generation means for a mass element in a first embodiment.

FIG. 7 shows a device according to the invention with centrifugal force generation means, which has a mass element 27. Drive motor 5, drive shaft 9 as well as the helical gearwheels 30, 30', 31, 31' arranged thereon, the associated braking elements 32, 32', 33, 33', the annular rims 34, the brake levers 35, 35' and the control elements 36, 36', and also the positioning pins 23 correspond to those described with regard to FIG. 6 and are thus not specifically described here.

The drive shaft 9 is in this case connected directly to the disc turntable 4 and the centring pin 2. The positioning pins 23 engage in holes 26 in a mass element 27, which essentially consists of a radially outer ring element 37 and a perforated disc 38 arranged thereon. In the exemplary embodiment, the radially inner region of the perforated disc 38 bears in the axial direction on the helical gearwheel 30' as well as on the centring pin 2, but is spaced apart in the radial direction from the drive shaft 9, thereby enabling mobility both in the radial and in the angular direction. The mass element 27 has a recess 21', in which a drive pin 20' arranged on the disc turntable 4 engages. Drive pin 20' and recess 21' are provided with play, with the result that mobility of the mass element 27 relative to the disc turntable 4 is ensured in this case, too. The play is essentially present in the radial direction Drive pin 20' and recess 21' ensure that the mass element 27 is caused to rotate in a manner coupled to the disc turntable 4. Radial displacement and angular displacement of the mass element 27 ensue in the manner described with regard to FIG. 6, in that case with regard to the disc turntable 4. It goes without saying that the individual components arranged on the drive shaft 9 are mounted as frictionlessly as possible both with respect to the said drive shaft and with respect to one another and also with respect to the radially inner region of the disc 38, in order to minimize friction losses.

Positioning pin 23, helical gearwheels 30, 30', 31, 31' and also braking elements 32, 32', 33, 33' together form a positioning gear mechanism 41 which serves for the positioning of the mass element 27 and/or of the disc turntable 4 and, via the latter, of the recording medium 1.

Figure 8:
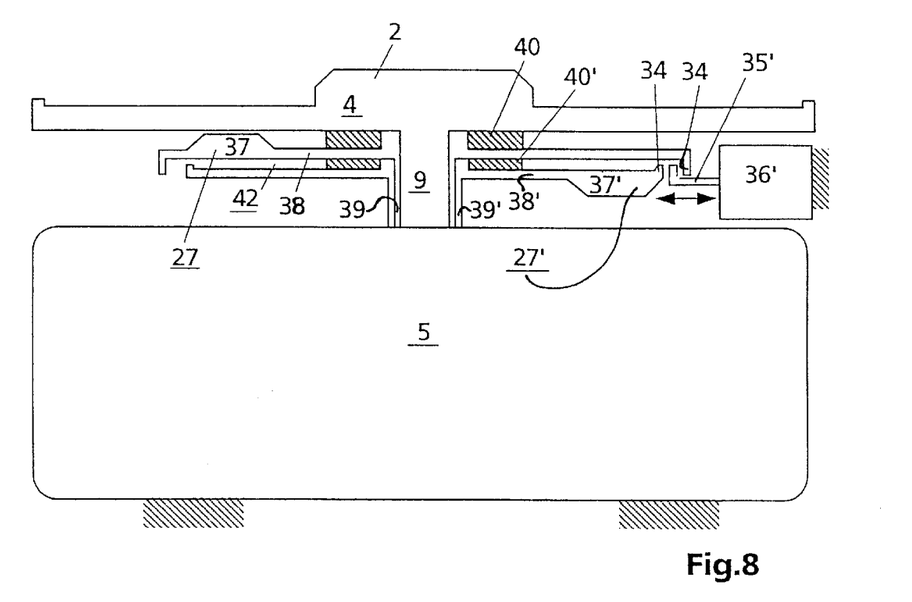
FIG. 8 shows a device according to the invention in accordance with FIG. 7 with two mass elements.

FIG. 8 shows part of a device according to the invention with centrifugal force generation means 42, which has two mass elements 27, 27'. The main proportion of the mass of the mass element 27 or 27' is arranged in a ring element 37 or 37', respectively, which is adjoined radially inwardly by a perforated disc 38, 38', which, at its radially inner end, merges with a sleeve 39, 39' mounted in a sliding manner on the drive shaft 9 of the drive motor 5. The sleeves 39, 39' are also mounted such that they slide with respect to one another. Arranged on the perforated discs 38, 38' are drivers 40, 40' which consist, for example, of a rubber ring and normally ensure that the elements which bear on them, namely disc 38 and disc turntable 4 and disc 38' and disc 38, respectively, do not move relative to one another. However, the drivers 40, 40' composed of elastic material do enable a relative movement of the corresponding components when forces acting between these components exceed a specific minimum value. Such forces are engendered by braking of one of the mass elements 27 or 27' due to displacement of a brake lever 35' which comes into contact with an annular rim 34 of the corresponding mass element 27 or 27'. The brake lever 35 is activated by a control element 36', as described with regard to the previous figures. Since two mass elements 27, 27' which can be placed independently of one another are involved in this exemplary embodiment, only a single brake lever 35' is necessary since the centre of mass formed by the two mass elements 27 and 27' can be positioned freely both in the angular position and in the radial direction by virtue of the independent angular positioning of the individual mass elements 27, 27' themselves.

Figure 9A:
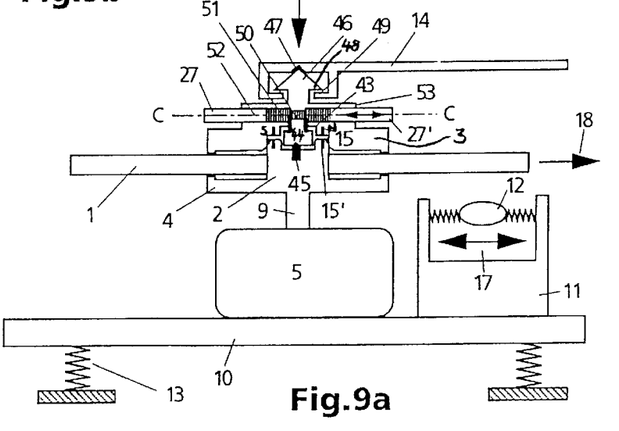
FIG. 9a shows a device according to the invention in accordance with FIG. 7 in a second embodiment, in a sectional illustration.
Figure 9B:
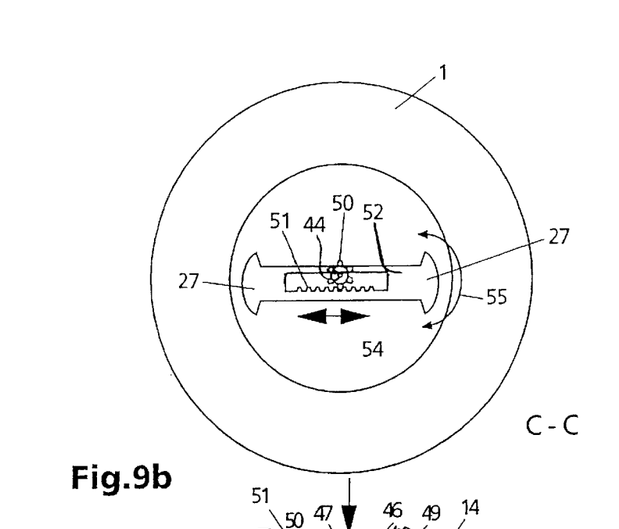
FIG. 9b shows a device according to the invention in accordance with FIG. 9a, in plan view.

FIGS. 9a and 9b show a device according to the invention with centrifugal force generation means, which has a positionable mass element, in a further embodiment. FIG. 9a in this case shows a partially sectional side view similar to FIG. 1, while FIG. 9b illustrates a section through FIG. 9a along the line CC.

In FIG. 9a, the parts corresponding to FIG. 1 are provided with the same reference symbols and are not specifically described insofar as there is no difference from FIG. 1. The disc turntable 4 is in this case connected directly to the drive shaft 9. The centring pin 2 is also connected to the disc turntable 4 and has magnets 15' at its upper end. The magnets 15' interact with magnets 15 of the holding element 3, in order to press the latter against the recording medium 1. The holding element 3 has a central stepped hole 43, through which a cylinder 44 reaches whose lower end facing the centring pin 2 has a peripheral projection whose external diameter is greater than the internal diameter of the step of the stepped hole 43. Movement of the cylinder 44 upwards thus has the result that the peripheral projection comes into contact with the step of the hole 43 and, as the cylinder 44 lifts further, the holding element 3 is driven and, consequently, the holding element is lifted from the recording medium 1. In the position of the cylinder 44 which is illustrated in FIG. 9a, the peripheral projection and the step of the hole 43 are spaced apart from one another. The lower part of the cylinder 44 is in contact with a centring tip 45 of the centring pin 2, in order to ensure centring with respect to the drive shaft 9. The upper end of the cylinder 44 is likewise provided with a centring tip 46, which is centred in a centring recess 47 of the lever 14. The cylinder 44 has a radial projection 48 below the centring tip 46. In the position illustrated in FIG. 9a, the projection 48 is axially spaced apart from a gripping element 49, which, during the lifting of the lever 14, comes into contact with the projection 48 and, consequently, effects lifting of the cylinder 44. The cylinder 44 has a toothed rim 50 in its central region, which toothed rim is engaged with a toothed rack 51. The toothed rack 51 is part of a beam element 52, at whose ends a respective mass element 27, 27' is arranged. The beam element 52 rests, on the one hand, on the holding element 3 and, on the other hand, is in contact with a pressure plate 53. The pressure plate 53 is secured to the cylinder 44.

In the position of the lever 14 which is illustrated in FIG. 9a, the cylinder 44 and thus the pressure plate 53 are pressed downwards, as a result of which the beam element 52 is also pressed against the holding element 3. Relative movement of beam element 52 and holding element 3 is not possible in this position. If the lever 14 is raised slightly, then although the beam element 52 and the pressure plate 53 still rest on the holding element 53, relative movement is possible in the event of the friction force being overcome. The effect of the lever 14 being lifted further is that the gripping element 49 comes into contact with the radial projection 48 of the cylinder 44, rotary movement of the cylinder 44 thereby being braked. The result of this is that the toothed rim 50 moves relative to the toothed rack 51 and, consequently, the beam element 52 is displaced in the radial direction.

This is indicated by the arrow 54 in FIG. 9b, which illustrates a section through FIG. 9a in accordance with the line CC. Arrow 55 indicates a rotary movement of the beam element 52 which is obtained by heavy braking or heavy acceleration of the disc turntable 4 and hence of the holding element 3 and of the recording medium 1 in the slighly raised position of the lever 14. In this case, a displacement in the radial direction in accordance with arrow 54 may also occur at the same time, this being attributable to the interaction of toothed rim 50 and toothed rack 51. By combining the two procedures described, it is possible to displace the mass elements 27, 27' both in their angular position and in their radial position and, consequently, to compensate for an unbalance U, see arrow 18, which is caused by the recording medium 1, for example.

Figure 10:
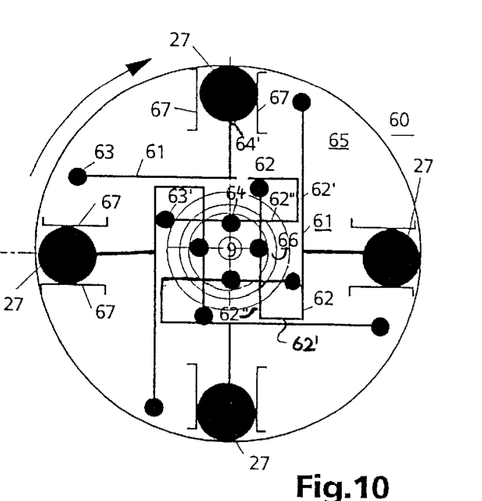
FIG. 10 shows unbalance compensation means of a device according to the invention with control means in neutral position, which control means follow the rotary movement.

FIG. 10 shows a diagrammatic illustration of an unbalance compensation means 60 of a device according to the invention, which is arranged for example instead of the ring elements 37, 37' and the control element 36' of FIG. 8 on a corresponding device. The unbalance compensation means 60 is represented in a sectional plane arranged perpendicular to the drive shaft 9 of the device. In the exemplary embodiment, the unbalance compensation means 60 has four mass elements 27, which are connected to a control means 61 composed of lever elements 62, 62' and 62" and having points of action 63, 63' on the unbalance compensation means 60 and further points of action 64, 64'. The points of action 63, 63' are arranged respectively in the outer and inner region of a base plate 65 of the unbalance compensation means 60, which base plate is designed as an annular disc. The point of action 64 lies on a control casing 66, which is arranged such that it is fixed with respect to the device and centred with respect to the drive shaft 9. The further point of action 64' is connected to the mass element 27. In the neutral position of the unbalance compensation means which is illustrated in FIG. 10, all the mass elements 27 have the same distance from the axis of rotation, that is to say from the drive shaft 9; an unbalance is not present. The base plate 65 has guide elements 67 by means of which the movably arranged mass elements 27 are guided in the radial direction. The base plate 65 rotates with the recording medium 1, that is to say with the same number of revolutions as the drive shaft 9, whereas the control casing 66 is stationary. The points of action 64 are mounted in sliding fashion, in rolling fashion or in another suitable manner on the inner face of the control casing 66.

Figure 11:
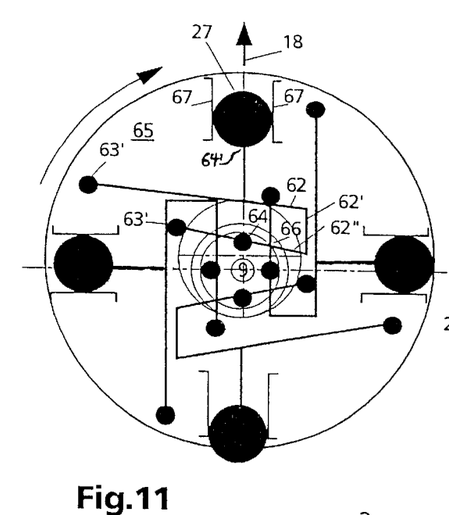
FIG. 11 shows unbalance compensation means in accordance with FIG. 10 in a compensation position.

In FIG. 11, the base plate 65 is displaced eccentrically with respect to the drive shaft 9 on account of an unbalance indicated by the arrow 18. Since the control casing 66 is undisplaced with respect to the drive shaft 9, the points of action 63, 63' located on the base plate 65 have been displaced with regard to the point of action 64. The lever elements 62, 62' and 62", which are connected to one another in an articulated manner, are tilted with respect to one another. Since the lever arm of the lever element 62" is shorter than that of the lever element 62, they are no longer parallel to one another in FIG. 11; they are both tilted towards the centre point of the base plate 65. Consequently, the point of action 64' on the mass element 27 is likewise displaced towards this centre point. This applies to the mass element 27 illustrated in the upper part of FIG. 11. The guide elements 67 ensure that the mass element 27 moves in the radial direction. The mass element 27 represented in the lower part of FIG. 11 is displaced radially outwards since in this case the corresponding lever elements are likewise displaced away from the centre of the base plate 65. The mass elements represented on the left and right in FIG. 11 are undisplaced in the assumed direction of the unbalance. The lever arms of the lever elements 62, 62',62" and also the total length thereof and the mass of the mass elements 27 and also of the base plate 65 are designed in such a way that the movement of the mass elements which is effected counter to the movement of the base plate 65 suffices to compensate for the unbalance. Instead of the four mass elements illustrated, it is also possible for three, five, six or a higher number of mass elements to be arranged correspondingly, without leaving the scope of the present invention.

Figure 12:
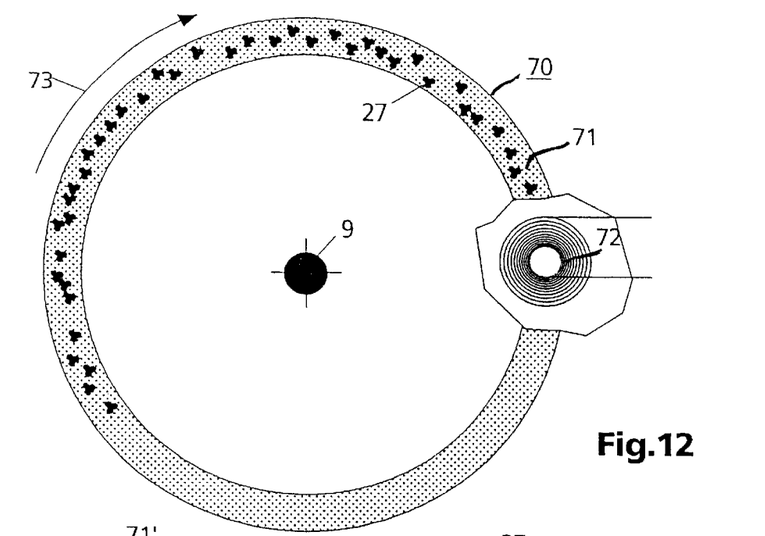
FIG. 12 shows centrifugal force compensation means with a plurality of small mass elements, in plan view.

FIG. 12 represents a centrifugal force compensation means 70 which can be arranged instead of the ring elements 37, 37' of FIG. 8. It has an annular cavity 71, which encloses a multiplicity of small mass elements 27. The mass elements 27 are preferably iron particles or other substances having magnetic properties, for example a magnetic fluid. In addition to the mass elements, the cavity 71 contains a liquid or a gas, preferably of a defined composition. The cavity 71 is arranged such that it is centred with respect to the drive shaft 9. In the right-hand part of FIG. 12, in a broken illustration, it is evident that an electromagnet 72 is arranged as a long-range-force-generating element underneath the cavity 71. Arrow 73 indicates the direction of rotation of drive shaft 9 and centrifugal force compensation means 70.

As soon as the drive shaft 9 is made to move, the mass elements 27 are accelerated towards the outer edge of the cavity 71 on account of the centrifugal force. At low speeds, the friction force may still be greater than the centrifugal force, with the result that the mass elements 27 begin to move outwards only starting from a specific speed of rotation. The electromagnet 72 is activated in the acceleration phase, whereupon the mass elements, on account of the magnetic force of attraction, accumulate on that wall of the annular cavity 71 which is adjacent to the electromagnet 72. In this case, the magnetic field generated by the electromagnet 72 is so strong that the mass elements are all gathered on the electromagnet 72 despite the movement of the cavity 71. FIG. 12 accordingly shows a picture in which about half a revolution has already occurred since the electromagnet 72 was switched on.

Figure 13:
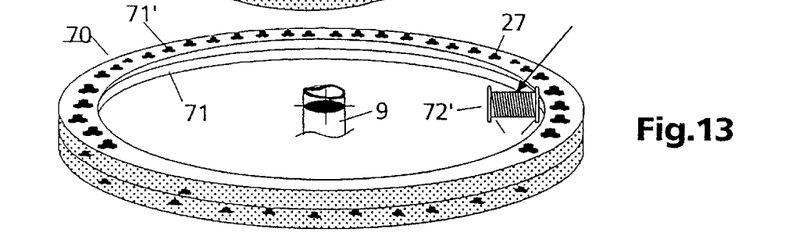
FIG. 13 shows centrifugal force compensation means in accordance with FIG. 12, in a perspective view.

A centrifugal force compensation means 70 in accordance with FIG. 12 is evident in FIG. 13, in a perspective illustration. In this case, two annular cavities 71, 71' are arranged one above the other. Moreover, an electromagnet 72' arranged radially on the inside is evident. The electromagnet 72' serves to gather the mass elements 27 of the cavity 71', while a further electromagnet (not represented here) is arranged either likewise radially on the inside or underneath the cavity 71 in order to gather the mass elements 27 located therein.

Figure 14:
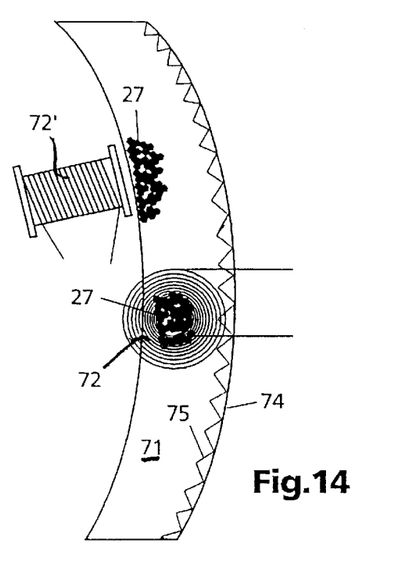
FIG. 14 shows part of a centrifugal force compensation means in accordance with FIG. 12 with a long-range-force-generating element in a first operating state.

This is illustrated in FIG. 14. For the purpose of simplifcation, both alternatives, namely an electromagnet 72 arranged below or above the cavity 71 as well as a magnet 72' arranged radially on the inside, are illustrated here. Both are in operation and have gathered the mass elements 27. The inner wall of the cavity 71 is provided with a structured surface 75 on its outer circumference 74, which structured surface serves as adhesion element or holding element.

Figure 15:
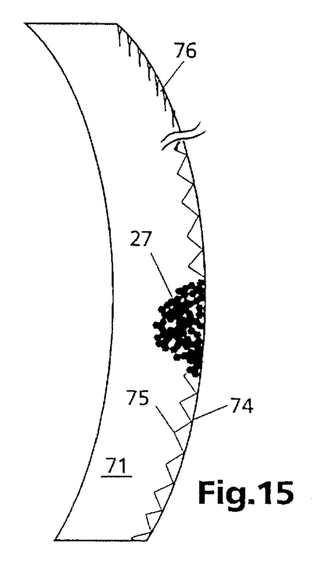
FIG. 15 shows the said part in accordance with FIG. 14 in a second operating state.

As soon as a recording medium has been inserted into the device according to the invention, the drive motor is switched on, as a result of which the cavity 71 is made to effect the rotary movement. At the same time, the electromagnet 72, 72' is activated and the mass elements 27 are consequently gathered. The unbalance of the rotating system, which is primarily caused by the unbalance of the recording medium, is determined by means of a sensor (not illustrated here) and a corresponding evaluation unit. In accordance with a suitable method, the position at which the compensation mass ought to be arranged is thereupon determined. If the cavity 71 is in the corresponding angular position, then the electromagnet 72, 72' is switched off, whereupon the mass elements 27 are accelerated and pressed against the outer circumference 74 on account of the centrifugal force. They remain there on the structured surface 75. This is illustrated in FIG. 15. The mass elements 27, preferably have a polyhedral or rough surface, with the result that they adhere, on the one hand, to the structured surface 75 of the cavity 71 and, on the other hand, reciprocally with respect to one another. More uniform distribution of the mass elements 27 over a larger region of the circumference 74 can be obtained by a defined reduction of the magnetic field strength generated by the electromagnet 72, 72'.

The upper part of FIG. 15 illustrates the surface provided with cavities 76 having directed openings, with the result that in the event of a direction of rotation corresponding to arrow 73, the mass elements 27 are held in the cavities, even if the speed of rotation is reduced or brought to zero. Accordingly, in the event of renewed acceleration, renewed positioning of the mass elements 27 is not necessary. For the purpose of repositioning, rotation is momentarily effected counter to the direction of the arrow 73, as a result of which the mass elements 27 which were situated in the cavities 76 leave the latter and can be gathered by the electromagnet 72, 72'.

The second cavity 71' shown in FIG. 13 serves for forming two accumulations of mass elements 27 in each of the two cavities 71, 71'. Something similar is likewise possible by arranging two electromagnets 72 on a single cavity 71, but in this case it is more difficult to ensure uniform distribution of the two mass elements on both electromagnets 72.

Figure 16:
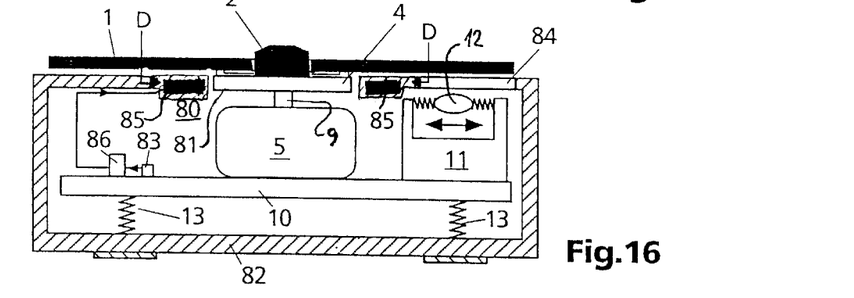
FIG. 16 shows a device according to the invention with long-range force generation means.

In FIG. 16, it is evident that the recording medium 1 rests on the disc turntable 4 in a manner centred by the centring pin 2. Arranged underneath the disc turntable 4 is a rotor 81, which is part of the additional force generation means 80 serving as unbalance compensation means. The rotor 81 is arranged on the drive shaft 9, which is driven by the drive motor 5. The drive motor 5 is arranged on a support element 10 which is arranged on a housing 82 via damper elements 13. A sensor 83 and also the scanner 11 with lens 12 are furthermore arranged on the support element 10. Through an opening 84 in the housing 82, a scanning beam (not illustrated here) passes from the scanner 11 through the lens 12 onto the recording medium 1. The scanning of an optical recording medium of this type is generally known and, therefore, need not be explained in any detail here. Furthermore, electromagnets 85 are arranged on the upper part of the housing 82, adjacent to the rotor 81, and are likewise part of the additional force generation means 80.

The sensor 83 serves to generate a signal which is related to the unbalance caused by the recording medium 1, for example. The sensor 83 is a vibration sensor, for example. The output signal of the sensor 83 is evaluated by a control unit 86, which determines from the said signal the way in which the electromagnets 85 must be driven so as to generate a centrifugal force which counteracts the unbalance. For this purpose, the rotor 81 likewise has magnetic properties, for example permanent magnets are arranged in it.

Figure 17:
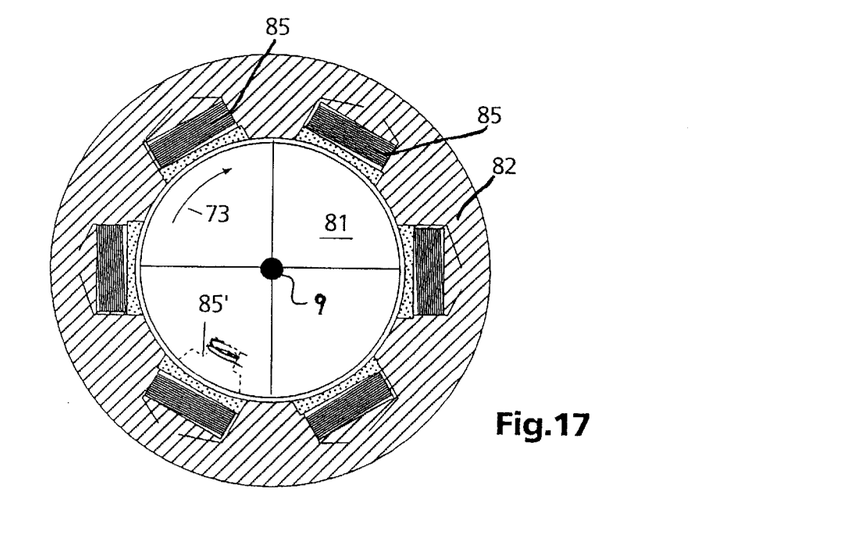
FIG. 17 shows centrifugal force generation means of the device in accordance with FIG. 16.

FIG. 17 shows a section in accordance with the line DD of FIG. 16. Part of the housing 82 is evident in which six electromagnets 85 are arranged. The rotor 81 is connected to the drive shaft 9 and arranged such that it is centred with respect thereto. A narrow gap is present between the rotor 81 and the electromagnets 85. In order to read from or write to the recording medium 1, the latter is made to rotate, drive shaft 9 and rotor 81 rotating in direction of the arrow 73. Any system unbalance that may be present causes the rotor 81 to begin to vibrate. In order to compensate for this vibration, it is necessary to generate a centrifugal force which circulates at the frequency of the rotor 81 and acts in the opposite direction to the force engendered by the unbalance. The electromagnets 85 are provided for this purpose, the said electromagnets being driven by the control unit 86 in such a way that a circulating magnetic field is generated which generates the corresponding compensation force.

In an alternative refinement, the lens 12 and the scanner 11 are used as vibration sensor instead of the sensor 83. The movement of the lens 12, which is also influenced, inter alia, by the vibration generated by the unbalance, is determined by means of sensors present in the scanner 11, for example photodetectors and a corresponding evaluation logic arrangement, and utilized for corresponding driving of the electromagnets 85. In a further alternative refinement of the invention, a signal engendered by the circulating magnetic field which compensates for the unbalance is superposed on the electromagnets of the drive motor 5, instead of the electromagnets 85. In a further refinement of the invention, the drivable electromagnets, indicated as electromagnet 85' in the lower region of FIG. 17, are arranged in the rotor 81, which has the advantage that the frequency of the magnetic field generated by the electromagnets 85' is always synchronous with the frequency of the rotor 81.

Figure 18:
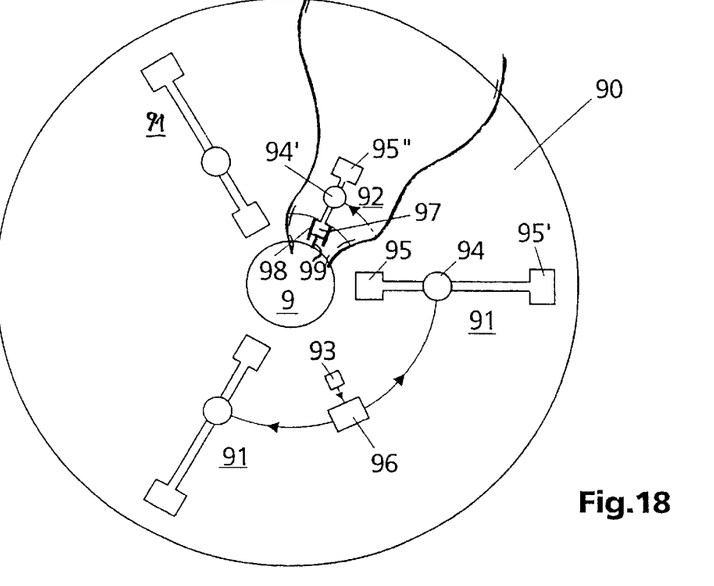
FIG. 18 shows an unbalance compensation means with elements arranged according to the invention on a rotating part of the device.

FIG. 18 shows a diagrammatic illustration of an unbalance compensation means 90, which, for example, is arranged at the position of the rotor 81 of FIG. 16 on the drive shaft 9. It has a sensor element 93, which is designed as a vibration sensor and whose signal is evaluated by a control unit 96, which forwards an open-loop or closed-loop control signal to centrifugal force generation means 91. In the exemplary embodiment, three such centrifugal force generation means 91 are arranged such that they are distributed uniformly on the unbalance compensation means 90. In an alternative illustration, the upper right-hand part of FIG. 18 illustrates a positioning means 92, which is likewise arranged in an at least triple design distributed uniformly over the alternative configuration of the unbalance compensation means 90.

The centrifugal force generation means 91 has a micropump 94, which is connected to a radially inner tank 95 and a radially outer tank 95'. The micropump 94 is able to convey a fluid from the radially inner tank 95 to the radially outer tank 95', or vice versa. A displacement of the mass distribution of the unbalance compensation means can be obtained in this way. The mass distribution which is necessary for unbalance compensation can be obtained by joint interaction of a plurailty of centrifugal force generation means 91. The elements illustrated in FIG. 18 are represented only diagrammatically; they are realized for example as micromechanical components, so-called mechatronic components, on a semiconductor support.

The alternative refinement with positioning means 92 also has a micropump 94' which is connected to an outer tank 95" and a pressure space 97 of a pressure cylinder 98. The piston 99 of the pressure cylinder 98 is supported on the drive shaft 9, while the pressure cylinder 98 is secured to the unbalance compensation means 90. If fluid is conveyed from the tank 95" into the pressure space 97 by the micropump 94', then the distance between the unbalance compensation means 90 and the drive shaft 9 is increased at this point. The unbalance compensation means 90 is consequently repositioned relative to the drive shaft 9, as a result of which an unbalance is likewise generated, artificially, which acts in the opposite direction to the unbalance of the system. The requisite force can be generated by a large number of positioning means 92, which are likewise designed as micromechanical or mechatronic components.

Although not all of the exemplary embodiments described have every expedient combination of features according to the invention, all these combinations nevertheless lie within the scope of the invention, even if they are not expressly pointed out.

What is claimed is:

1. A Device for reading from or writing to recording media in disc form having a drive motor, a securing means and an unbalance compensation means, wherein:
   the unbalance compensation means is a centrifugal force generation means for generating a centrifugal force which is controlled, during operation, to assume variable values; and wherein:
   the unbalance compensation means comprises a rotating part on which a sensor element, an evaluation means and the centrifugal force generation means are arranged.

2. Device according to claim 1 wherein said sensor and said evaluation means generates a control signal of the unbalance compensation means.

3. Device according to claim 2, wherein said sensor is a vibration sensor.

4. Device according to claim 3, wherein a lens and a scanner of the device are used as said vibration sensor.

5. Device according to claim 1, wherein at least one of the sensor element, the evaluation means and the centrifugal force generation means is a micro mechanical element.

6. Device according to claim 1, wherein at least one of the sensor element, the evaluation means and the centrifugal force generation means is a micro electronic element.

* * * * *